Patented Nov. 5, 1929

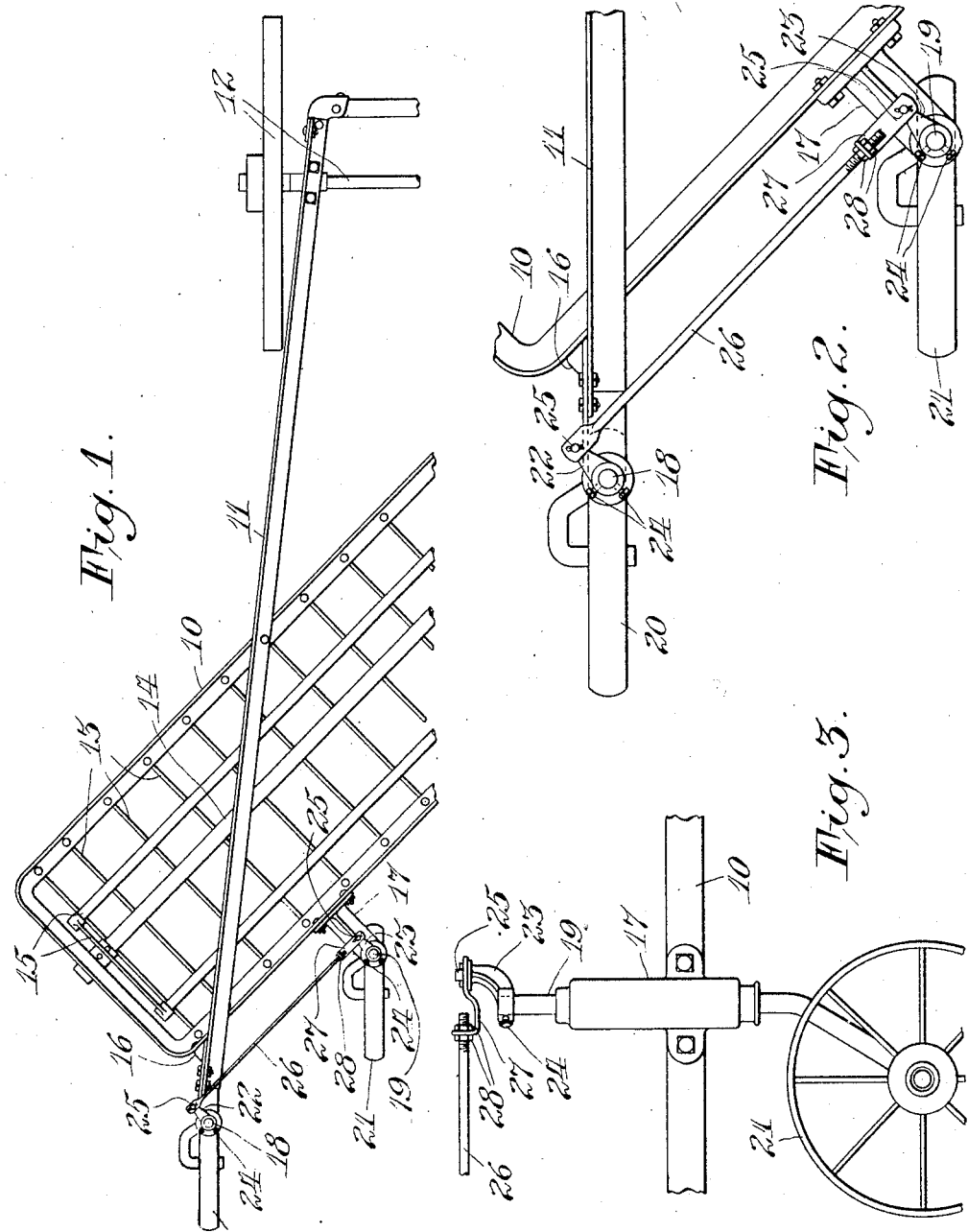

1,734,393

UNITED STATES PATENT OFFICE

EDWARD MOWRY, OF ROCK FALLS, ILLINOIS, ASSIGNOR TO INTERNATIONAL HARVESTER COMPANY, OF CHICAGO, ILLINOIS, A CORPORATION OF NEW JERSEY

CASTER-WHEEL-CONTROLLING DEVICE FOR SIDE-DELIVERY RAKES

Application filed December 17, 1923. Serial No. 681,074.

This invention appertains to an improvement in side delivery rakes of the type having a frame disposed diagonally to the line of draft of the machine. The frame of such a machine is carried by wheels at its front end and by a freely rotatable, trailing caster wheel or wheels at its rear end. In such machines heretofore provided with more than one trailing caster wheel, certain objections arose because these wheels castered or angled independently of one another. If one struck an obstruction individual to it, it would be angled while the other one would not. Such differential angling of the casters materially increases the draft of these machines and is, therefore, objectionable.

Having these deficiencies in mind, it is an object of this invention to provide in a machine of the type mentioned, a plurality of freely rotatable, trailing, frame-supporting, caster wheels, which will always angle together in the same direction.

It is another object to provide means for accomplishing the above object entirely independent of any attention from the operator; in other words, an arrangement which functions automatically.

Still another object is to provide an adjustment for this caster controlling means which will always insure proper alignment of the wheels with respect to each other.

A further object is to provide a caster wheel control which will not readily get out of order in use, and which lends itself to manufacture at a minimum of cost because of its simplicity, and one which may be fitted as an attachment to side delivery rakes now in use.

The above objects are accomplished by providing a simple, adjustable connecting device between the caster wheels, so arranged that, when one is angled, the other will also angle in the same direction in response to movement of the first, all as hereinafter specifically described.

Reference is made to the accompanying sheet of drawings wherein the invention is illustrated. Throughout the several views like characters of reference denote like parts, and in these drawings,—

Fig. 1 is a plan view of a fragment of a side delivery hay rake showing the improved caster wheel controlling device applied thereto;

Fig. 2 is an enlarged detail view showing the improved caster wheel controlling device in plan; and Fig. 3 is an elevational view of one of the caster wheels showing the length adjustment for the connecting link applied thereto.

The side delivery rake shown in Fig. 1 is conventional and is of that type comprising a frame 10 diagonally disposed to the line of draft of the machine. The end of the frame shown is attached to a truss beam 11 comprising the main frame of the machine and carried at its forward end by an axle and supporting wheels 12. The diagonally disposed frame 10 is rectangular in shape, as shown, and carries the usual stripper bars 13 and rotatable shaft 14, on which is mounted the raking cylinder 15.

Bolted to the rear end of the truss beam 11 is a bracket 16, and, spaced from this a suitable distance and bolted to the rear side of the rectangular frame 10, is another bracket 17. Rotatably journaled in these two brackets are the vertically disposed spindles 18 and 19 of caster wheels 20 and 21, respectively. It will thus be noted that these trailing caster wheels support the rear end of the machine and are freely rotatable in the brackets which secure them to the frame.

As stated in the objects of this invention, it is very advantageous and desirable that these caster wheels, two of which are shown in the preferred embodiment of this invention, be turnable in the same direction. Thus, with these caster wheels capable of simultaneous angling in the same direction, it will be obvious that a material reduction in the draft of the machine is effected. To accomplish this result, the upper ends of each of the spindles 18 and 19 of the caster wheels shown are provided with a laterally extending crank 22 and 23, respectively, each of these cranks being locked to the spindle to rotate therewith by suitable means such as set screws 24. The free ends of these cranks are provided with vertical pins 25, and pivotally connected to the pin 25 on the crank 22 is the flattened end portion of a link 26, which is extended in parallelism with the rear side of the rectangular frame 10. Pivotally connected to the pin 25 on the crank 23 is a short arm 27 having its end bent upwardly at a right angle and apertured to receive the free end of the connecting link 26. The free end of the connecting link 26 adjacent the arm 27 is screw threaded for the reception of an adjusting means, such as a pair of nuts 28, one nut being disposed on each side of the angularly bent portion of the arm. It is clear then that, by adjustment of these nuts, the effective length of the connecting link 26 may be predetermined for the purpose of insuring proper alignment of the wheels with respect to each other.

In the operation of the machine in the field it will be obvious that if one of the caster wheels, (let us assume it to be the one numbered 20), should strike an obstruction, it will be angled either to the left or to the right, and, because of the rigid link connecting this caster wheel to the other caster wheel 21, it will move this latter caster wheel in the same direction to an extent equal to the angle through which the first caster wheel has moved.

In assembling the device, the caster wheels may be easily aligned with respect to each other by means of the adjusting nuts 28 described.

It is to be understood that the particular form of my invention herewith shown and described is to be taken as a preferred example of the same and that various changes in the arrangement may be resorted to without departing from the spirit of the invention or the scope of the appended claims.

What is claimed is:

1. A side delivery rake having a frame carrying a diagonally disposed raking cylinder, a front wheel support for the frame, a pair of diagonally offset, spaced, freely castering, trailing wheels supporting the rear end and an intermediate part of the frame, and rigid means connecting the two castering wheels to cause them to angle together in unison and in the same direction when one of them strikes an obstruction, the caster wheels being independent of the front wheel support.

2. A side delivery rake having a frame carrying a diagonally disposed raking cylinder, a front wheel support for the frame, a pair of diagonally offset, spaced, freely castering, trailing wheels including spindles supporting the rear end and an intermediate part of the frame, cranks on the spindles, and a rigid connection between said cranks to cause the wheels to angle together in unison and in the same direction when one of them strikes an obstruction, the caster wheels being independent of the front wheel support.

3. A side delivery rake having a frame carrying a diagonally disposed raking cylinder, a front wheel support for the frame, a pair of diagonally offset, spaced, freely castering, trailing wheels including spindles supporting the rear end and an intermediate part of the frame, cranks on the spindles, a rigid connection between said cranks to cause the wheels to angle together in unison and in the same direction when one of them strikes an obstruction, the caster wheels being independent of the front wheel support, and means for adjusting said connection to correct the angularity of the caster wheels relative to each other.

In testimony whereof I affix my signature.

EDWARD MOWRY.